United States Patent [19]

Wu et al.

[11] Patent Number: 4,666,955

[45] Date of Patent: May 19, 1987

[54] BLOCK COPOLYMERS FOR ENHANCED OIL RECOVERY

[75] Inventors: Muyen M. Wu; Lawrence E. Ball, both of Cuyahoga Falls, Ohio

[73] Assignee: The Standard Oil Company, Cleveland, Ohio

[21] Appl. No.: 740,104

[22] Filed: May 31, 1985

Related U.S. Application Data

[62] Division of Ser. No. 499,717, May 31, 1983, Pat. No. 4,540,498.

[51] Int. Cl.[4] ............................................. C08F 2/50
[52] U.S. Cl. .................................. 522/174; 522/175; 522/178; 522/181; 522/182; 525/212; 525/218; 525/221
[58] Field of Search ...................... 525/212, 218, 221; 522/174, 175, 178, 181, 182

[56] References Cited

U.S. PATENT DOCUMENTS 3,763,277 10/1973 Chu et al. .............................. 210/54
3,993,712 11/1976 Guilbault ............................. 525/292
4,347,339 8/1982 Boevink et al. ...................... 525/217

Primary Examiner—Melvyn I. Marquis
Attorney, Agent, or Firm—David P. Yusko; John E. Miller; Larry W. Evans

[57] ABSTRACT

Water soluble block copolymers having two or more water soluble polymer blocks useful for controlling the viscosity of aqueous media used in enhanced oil recovery techniques are described.

15 Claims, No Drawings

BLOCK COPOLYMERS FOR ENHANCED OIL RECOVERY

This is a division of application Ser. No. 499,717 filed May 31, 1983 now U.S. Pat. No. 4,540,498.

BACKGROUND OF THE INVENTION

This invention relates to the use of polymers in enhanced oil recovery techniques whereby polymer solutions are used either alone or in conjunction with other additives to achieve better volumetric sweep of the reservoir. The polymers function primarily by altering the permeability of the reservoir toward water, or more importantly, by increasing the viscosity of the water to more effectively displace oil. To be effective, the polymers must achieve high viscosity in the reservoir water, usually a brine, as well as have low adsorption on the rock and stability in the chemical, thermal and biological environment in the reservoir.

Water soluble random copolymers useful in secondary and tertiary oil recovery processes are known and various processes for making these copolymers are also known. U.S. Pat. No. 4,024,040 discloses a water soluble, substantially linear, high molecular weight random copolymer of ethylenically unsaturated monomers prepared by gamma irradiation. Illustrative examples include the monomers of acrylamide, methacrylamide, 2-acrylamido-2-methylpropanesulfonic acid, acrylic and methacrylic acids and their water soluble salts.

Other patents disclose copolymers of acrylic acid/acrylamide and 2-acrylamido-2-methylpropanesulfonic acid/acrylamide and include U.S. Pat. Nos. 4,024,040; 4,137,969; and 3,858,652. However, the single step method of preparation in these references, of reacting two monomers simultaneously, results in a random copolymer and not a block copolymer, as in the present invention.

Gamma radiation-induced polymerization of acrylamide and/or methacrylamide and acrylic acid, methacrylic acid, and/or alkali metal salts thereof to produce random copolymers is also disclosed in U.S. Pat. No. 3,841,401.

Block copolymers are disclosed in U.S. Pat. No. 3,984,333, however, the block copolymer is not completely water soluble because it is comprised of a water-insoluble polymer chain in addition to a water-soluble chain. Moreover, sulfonation of the water-insoluble starting monomers is necessary to impart the water-soluble characteristics to a portion of the block copolymer molecule.

It has now been discovered that water soluble block copolymers comprising two or more water soluble polymer blocks provide high viscosity in saline waters making them desirable for mobility control in enhanced oil recovery applications.

SUMMARY OF THE INVENTION

A water soluble block copolymer having two or more water soluble polymer blocks provides superior viscosity for mobility control in the process of enhanced oil recovery. Preferably, the copolymer is composed of two different, mutually exclusive water soluble polymer blocks chemically bonded in the molecule. The block copolymers of this invention exhibit high viscosities because the individual segments react differently toward solvent waters. Particularly significant is the ability of the block copolymer to retain its shape or only moderately change shape upon charge neutralization in electrolyte solution.

It is anticipated that any water soluble monomer capable of polymerization to produce a water soluble block copolymer can be employed in this invention. The preferred block copolymers are poly(2-acrylamido-2-methylpropanesulfonic acid-b-acrylamide) and poly(acrylic acid-b-acrylamide).

The block copolymers of this invention may be prepared by known techniques of polymerization, but those preferred are the free radical sequential reactions via photoinitiation (ultraviolet irradiation) and difunctional initiators.

DETAILED DESCRIPTION OF THE INVENTION

The present invention may be stated as a process of recovering hydrocarbon from a hydrocarbon-bearing subterranean formation having at least one injection means in fluid communication with at least one production means wherein polymer solution is injected into the formation to displace hydrocarbon toward the production means through which hydrocarbon is recovered, the improvement comprising injecting a polymer solution comprising a water soluble block copolymer said copolymer comprising two or more water soluble polymer blocks.

Suitable polymer concentration varies due to the wide variety of reservoir requirements in the field including reservoir temperature, shear factors and the nature of the copolymer itself that is used. The concentration requirements in view of these variables can readily be determined by one skilled in the art. Ideally, an aqueous viscosity that would achieve a mobility ratio equal to or less than 1 (one) between the oil and water phases would produce the maximum oil recovery. It is anticipated that up to 5 pounds of polymer may be required for each barrel of oil recovered.

The water soluble block copolymer of the present invention comprises two or more water soluble polymer blocks chemically attached in the same molecule. Each water soluble polymer block comprises a water soluble polymerized monomer. More than two different monomers may comprise the different blocks. The water solubility of each block segment renders the whole block copolymer molecule water soluble. It is anticipated that the block copolymer may be diblock (A-B), triblock (A-B-A) or (A-B-C), or multiblock (A-B)n in structure. It is also envisioned that the composition within a particular block may comprise more than one monomer.

The monomers comprising the block copolymer may be any water soluble polymerizable monomer which produces a water soluble polymer. Suitable monomers include acrylamide, methacrylamide, ethylene oxide, ethylene imine, vinyl methyl ether, vinyl pyrrolidone, acrylic and methacrylic acids and their water soluble salts and N-substituted acrylamides, such as 2-acrylamido-2-methyl-propanesulfonic acid. The preferred monomers include acrylamide, methacrylamide, vinyl methyl ether, vinyl pyrrolidone, acrylic and methacrylic acid and their water soluble salts and N-substituted acrylamides, such as 2-acrylamido-2-methylpropanesulfonic acid and N-methylacrylamide.

Since the block copolymer is macromolecular in nature, the molecules exact a positive influence on the viscosity of aqueous solutions. The viscosity of a solution increases as the concentration or molecular weight of the block copolymer is increased.

Moreover, the shape of the molecule has an effect on the viscosity of the solution, therefore it is desirable that the block copolymer possess a shape which produces a greater viscosity effect. Stiff, rod-like molecules have a greater positive effect on viscosity than comparable spherical, random coiled branching or non-linear molecules of the same molecular weight. Therefore, it is preferred that the block copolymer possess an anisotropic, more rod-like and essentially linear shape in order to produce a greater viscosity effect. Mutual repulsion of the unlike sections of the block copolymer molecule tends to distend or elongate the molecule in solution which is favorable to increase solution viscosity. Since individual segments react differently toward the solvent waters, one segment tends to be more stiff or rod-like than the other segment under any one set of conditions.

To be effective, the polymers used in tertiary or enhanced oil recovery methods must achieve high viscosity in the injected water which is usually a brine or sea water. Polymers in aqueous solution are greatly susceptible to electrolytes in the solvent water.

In sea water, the viscosity of partially hydrolyzed polyacrylamide is greatly reduced. This concept was demonstrated by measuring the viscosity of a Dow-Pusher series dissolved in 1.0% NaCl and Sea Water. (Pusher is a trademark of Dow Chemical Company, Midland, Mich., U.S.A.). The Dow Pushers are derived by polymerizing acrylamide, followed by partial hydrolysis, thereby rendering them approximately 30% hydrolyzed. The three grades of Pushers differ by increasing molecular weight:

| Dow Pusher | Molecular Weight $(10^{-6})$ |
|---|---|
| 500 | 3-5 |
| 700 | 5-7 |
| 1000 | 10 |

The sea water was a mixture of inorganic salts that duplicated the composition of natural sea water. In addition to a high concentration of divalent ions, such as $Mg^{++}$ and $Ca^{++}$, the sea water contained a total salinity of approximately 3.6%, which includes 1.9% NaCl. When viscosities of the polymer solutions were determined, on a Brookfield model LVT Viscometer using an ultra-low viscosity (UL) adapter, it was observed how viscosity is greatly reduced as salinity is increased. These results are summarized in the following Table I.

TABLE I

| VISCOSITY OF DOW PUSHER SERIES | | | |
|---|---|---|---|
| Dow Pusher | Viscosity at 10 $sec^{-1}$* 23° C. (cps) | | % Viscosity Loss |
| Polymer | 1% NaCl | Sea Water | Brine to Sea Water |
| 500 | 9.1 | 3.6 | −60 |
| 700 | 14.8 | 5.3 | −64 |
| 1000 | 17.5 | 7.3 | −58 |

*Obtained by extrapolation of experimental values

As can be seen from the summary of results in the above Table I, the partially hydrolyzed polyacrylamide polymers exhibit approximately a 60% decrease in viscosity in sea water from less concentrated brine water.

It is postulated that this reduction in viscosity of a polymer in salt solution is due to a neutralization of the polymer molecular charges by the salt ions which cause the molecule to assume a random coil shape of reduced size. The resulting collapsed coil has a reduced effect on the viscosity of the solution. Since the water soluble block copolymers of the present invention are composed of two separate, mutually excluding components, the one block cannot coalesce into the other block upon charge neutralization. Consequently, the solution volume of the molecule is retained or only moderately reduced by the presence of salt and a positive effect on the viscosity of the solution is retained. Examples 1–3, which are presented under Specific Embodiments demonstrate this viscosity-related behavior of the block copolymers of the present invention.

Known techniques of those skilled at polymerization may be used to prepare the block copolymers of this invention. Those techniques may include ionic and free radical reactions and may proceed in bulk, solution or two phase liquid systems such as emulsion or suspension. It is preferred that the free radical methods of sequential reaction of the monomers initiated by ultraviolet light and/or a difunctional initiator be employed.

A sequential photoinitiation reaction essentially consists of two steps comprising forming a bromine terminated prepolymer by irradiating with ultraviolet light a first water soluble monomer in the presence of bromoform; and irradiating with ultraviolet light said prepolymer in the presence of a second water soluble monomer to form said water soluble block copolymer.

The preparation of block copolymers using multifunctional free-radical initiators provides the unique feature of forming two free radicals on the same molecule through thermal and/or redox systems at different stages. Therefore, the polymerization for the formation of the block copolymer can be carried out sequentially. When carried out in two stages, the method for producing a water soluble block copolymer comprising two different water soluble polymer blocks is one comprising forming a polymeric initiator by reacting an activated difunctional initiator and a first water soluble monomer; then thermally initiating the polymerization of a second water soluble monomer in the presence of said polymeric initiator of step (a) to form the block copolymer.

Any difunctional initiator capable of undergoing a polymerization to form a water soluble block copolymer can be used. The preferred difunctional initiator is R-S602 which can be obtained from Lucidol, a division of Penwalt Chemical Co., and it has the following formula:

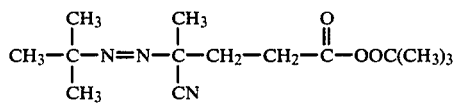

Activation of the initiator can be accomplished by the use of a reducing agent, such as triethylenetetramine (TETA), which activates the perester group on the molecule. The azo group can be thermally activated later.

Reaction conditions are dependent upon the synthesis route chosen. The following conditions are typical of those employed in free radical methods of polymerization, unless otherwise indicated. The reaction temperature employed is that required to activate thermally effective initiators, usually 45° C. or higher. Ultraviolet initiated systems are effective at any temperatures wherein the solutions are liquids. For water solutions, the effective temperature ranges from 0° C. to 100° C. The preferred temperature range for free radical water solutions is 20° C. to 95° C.

The polymerizations can be run in bulk, solution or two-phase liquid systems (emulsions). The monomer concentration may range from 1-2% to 100%. For solution and emulsion syntheses, the preferred monomer concentration range is from about 1% to 30%.

The reaction time is dependent upon the synthesis route chosen and the reaction temperature and may range from minutes for anionic initiation to many hours, 24 hours or more for free radical systems. The typical reaction time for free radical initiation is from 2 to 20 hours at ambient temperatures.

Pressure does not readily affect these reactions when in the range of 0-100 atmospheres. Typically, the reactions are run at atmospheric to slightly above atmospheric (1 atm) pressure.

It is anticipated that systems composed of block copolymers can tolerate the presence of homopolymers, thus precluding the necessity of purifying the products and allowing a number of techniques to be employed for their manufacture.

SPECIFIC EMBODIMENTS

Poly(2-acrylamido-2-methylpropanesulfonic acid-b-acrylamide) (Example 1) and Poly(acrylic acid-b-acrylamide) (Example 2) block copolymers were synthesized via sequential reaction initiated by ultraviolet irradiation and Poly(2-acrylamido-2-methylpropanesulfonic acid-b-acrylamide) was synthesized via a difunctional initiator (Example 3).

The resulting block copolymers were tested for viscosity in salt solutions of different concentrations. After dissolving the polymers in 1% NaCl brine solution and sea water at a concentration of 1200 ppm, the viscosity of the solutions was measured at various shear rates at ambient temperature. The results of all 3 Examples are summarized in Table II.

As in the Dow Pusher studies, the sea water was a mixture of inorganic salts that duplicated the composition of natural sea water. In addition to a high concentration of divalent ions, such as $Mg^{++}$ and $Ca^{++}$, the sea water contained a total salinity of approximately 3.6%, which includes 1.9% NaCl.

The polymer concentration was expressed on a weight/weight basis. A concentration of 1200 ppm means that 0.12 g of polymer was dissolved in enough salt solution to make 100 g of polymer solution.

Viscosity measurements of the polymer solutions were conducted with a Brookfield model LVT viscometer. An Ultra-Low Viscosity (UL) adapter provided amplifying effects making possible measurements in the ultra-low viscosity range. Calibration of the instrument showed an average error of ±0.2 cps. The shear rates tested are representative of the possible range of shear expected to be encountered underground in the flooding process. A shear rate of 10 $sec^{-1}$ is the average rate extrapolated from experimental values.

Example 1

Synthesis of Poly(2-acrylamido-2-methylpropanesulfonic acid-b-acrylamide) Via Sequential Photoinitiation Two 50 ml Pyrex ampoules were charged with a reaction mixture containing 25 gm AMPS monomer, 8.72 gm $CHBR_3$, 25 gm DMF and 10 gm freshly boiled distilled water. The DMF and water were purged with argon or nitrogen and the water was boiled before use. The solution was purged with nitrogen for 12 min. followed by flame sealing. The two ampoules were irradiated with UV light (medium pressure mercury lamp) for 4½ hours. The 2-acrylamido-2-methylpropanesulfonic acid polymer was first precipitated in isopropanol followed by 1800 ml of acetone. The polymer was washed thoroughly with acetone and dried in an oven at room temperature overnight. The polymeric 2-acrylamido-2-methylpropanesulfonic acid initiator yield was 72% (based on 2-acrylamido-2-methylpropanesulfonic acid + bromoform).

A 1-liter 3-necked flask was then charged with a solution containing 5 gm polymeric 2-acrylamido-2-methylpropanesulfonic acid initiator synthesized above, 15 gm acrylamide monomer and 750 gm freshly boiled distilled water purged with nitrogen. The mixture was purged with argon gas for 1 hour and 40 minutes, then irradiated with UV light (medium pressure mercury lamp) for 8 hours. The final block copolymer was precipitated in methanol, filtered and dried to yield 10 gm.

The block copolymer was tested for viscosity. As can be seen from the results summarized in Table II, 2-acrylamido-2-methylpropanesulfonic acid/Acrylamide block copolymer prepared by sequential photoinitiation showed higher viscosity performance in sea water compared to 1% brine.

Example 2

Synthesis of Poly(acrylic acid-b-acrylamide) Via Sequential Photoinitiation

A mixture of 30 ml acrylic acid with 9.0 ml of bromoform with a weight ratio of 6.72:1 was divided into four pyrex glass ampoules. The ampoules were purged with argon gas by bubbling for five minutes and flame sealed. The tubes were placed in an ice water bath, three inches beneath an 8 watt low pressure mercury ultraviolet lamp for 4 hours. The poly(acrylic acid) polymer with bromine end-groups was recovered by extraction with benzene to remove unreacted materials, and vacuum dried to yield the polymer at 30% conversion.

Two grams of this poly(acrylic acid) were dissolved in 160 ml of oxygen free water, neutralized to a pH=9.8 with sodium hydroxide and 6 gms of acrylamide were added. After sealing in purged ampoules and irradiating with ultraviolet light as before, the block copolymer was recovered as a precipitate from dioxane. The yield was 82.2%.

The resulting block copolymer was tested for viscosity. As can be seen from the results summarized in Table II, Acrylic Acid/Acrylamide block copolymer prepared by sequential photoinitiation showed higher viscosity performance in sea water compared to 1% brine.

Example 3

Synthesis of Poly(2-acrylamido-2-methylpropanesulfonic acid-b-acrylamide) Via Difunctional Initiator In a reaction vessel, 0.112 gm R-S602 difunctional initiator was dissolved in 40 gm methanol. To this was added 40 gm distilled water and 20 gm 2-acrylamido-2-methylpropanesulfonic acid monomer. The methanol was pre-purged with argon gas before use. The distilled water was boiled and purged with argon continuously until use. After purging the mixture with nitrogen for 20 min., 0.06 gm of triethylenetetramine (TETA) was injected. The reaction was allowed to proceed at room temperature under nitrogen purge for 18 hours. The polymer was precipitated in acetone and dried under vacuum at room temperature for 20 hours. The sample used to synthesize the block copolymer was partially dried, 3 hours vacuuming.

Then, a reaction vessel was charged with 8.2 gm partially dried polymeric initiator of 2-acrylamido-2-methylpropanesulfonic acid (6.8 gm when dried), 18 gm acrylamide monomer and 150 gm freshly boiled distilled water. After purging with nitrogen gas for 40 minutes, the vessel was closed and immersed in a tumbling water bath at 76° C. The reaction was allowed to proceed for 16 hours. The final block copolymer was precipitated in acetone, filtered, and dried under vacuum at 20°–40° C. for 2 days; a 73% yield was obtained.

When the resulting polymer was tested for viscosity, the 2-acrylamido-2-methylpropanesulfonic acid/acrylamide block copolymer exhibited greater viscosity in a more concentrated salt solution, as shown in Table II.

TABLE II

| | VISCOSITY VS. SHEAR RATE IN 1% NaCl AND SEA WATER | | | | |
|---|---|---|---|---|---|
| EXAM-PLE | BLOCK COPOLYMER AND SYNTHESIS ROUTE | SHEAR RATE (SEC$^{-1}$) | KINEMATIC VISCOSITY (CPS) AT 1200 PPM, 23° C. | | % VISCOSITY INCREASE BRINE TO SEA WATER |
| | | | 1% NaCl | SEA WATER | |
| 1 | 2-acrylamido-2-methylpropanesulfonic acid~/Acrylamide via Sequential Photoinitiation | 73.42 36.71 15.68 7.34 *10.00 | 2.72 2.84 3.00 3.00 3.05 | 3.20 3.28 3.45 3.50 3.50 | 15 |
| 2 | Acrylic Acid/Acrylamide via Sequential Photoinitiation | 73.42 36.71 14.68 7.34 *10.00 | 2.40 2.50 2.75 3.00 2.85 | 2.76 2.92 3.25 4.00 3.60 | 26 |
| 3 | 2-acrylamido-2-methylpropanesulfonic acid~/Acrylamide via Difunctional Initiator | 73.42 36.71 14.68 7.34 *10.00 | 2.16 2.30 2.45 2.55 2.50 | 2.74 2.82 3.00 3.05 3.03 | 21 |

*extrapolated from experimental values

We claim:

1. A water soluble block copolymer comprising two or more water soluble polymer blocks, wherein the water soluble polymer blocks comprise polymerized monomers wherein said monomers are selected from the group consisting of acrylamide, methacrylamide, vinyl methyl ether, acrylic and methacrylic acid and their water soluble salts and N-substituted acrylamides.

2. The block copolymer of claim 1 wherein said copolymer comprises two water soluble polymer blocks.

3. The block copolymer of claim 2 wherein one of said water soluble polymer blocks comprises polymerized acrylic acid and the other said water soluble polymer block comprises polymerized acrylamide.

4. The block copolymer of claim 2 wherein one of said water soluble polymer blocks comprises polymerized 2-acrylamido-2-methyl-propanesulfonic acid and the other said water soluble polymer block comprises polymerized acrylamide.

5. The block copolymer of claim 3 or 4 wherein said copolymer comprises a diblock structure.

6. The block copolymer of claim 3 or 4 wherein said copolymer comprises a multiblock structure.

7. A method for producing a water soluble block copolymer comprising two water soluble polymer blocks comprising:
(a) forming a bromine terminated prepolymer by irradiating with ultraviolet light a first water soluble monomer in the presence of bromoform; and
(b) irradiating with ultraviolet light said prepolymer in the presence of a second water soluble monomer to form said water soluble block copolymer.

8. The process of claim 7 wherein said first water soluble monomer comprises acrylic acid and said second water soluble monomer comprises acrylamide.

9. The process of claim 7 wherein the first water soluble monomer comprises 2-acrylamido-2-methyl-propanesulfonic acid and the second water soluble monomer comprises acrylamide.

10. A method for producing a water soluble block copolymer comprising two different water soluble polymer blocks comprising:
(a) forming a polymeric initiator by reacting an activated difunctional initiator and a first water soluble monomer; then
(b) thermally initiating the polymerization of a second water soluble monomer in the presence of said polymeric initiator of step (a) to form the block copolymer.

11. The method of claim 10 wherein the polymeric initiator of step (a) comprises 2-acrylamido-2-methyl-propanesulfonic acid.

12. The method of claim 10 wherein the difunctional initiator is one comprising the formula:

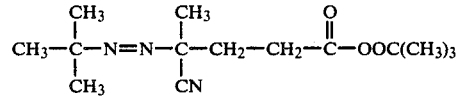

13. The method of claim 12 wherein the difunctional initiator is activated by triethylenetetramine (TETA).

14. The method of claim 13 wherein said first water soluble monomer is 2-acrylamido-2-methyl-propanesulfonic acid.

15. The method of claim 14 wherein said second water soluble monomer is acrylamide.

* * * * *